Aug. 31, 1937.  A. M. CAMERON  2,091,804
CAN SOLDERING MACHINE
Filed Aug. 22, 1935   3 Sheets-Sheet 2
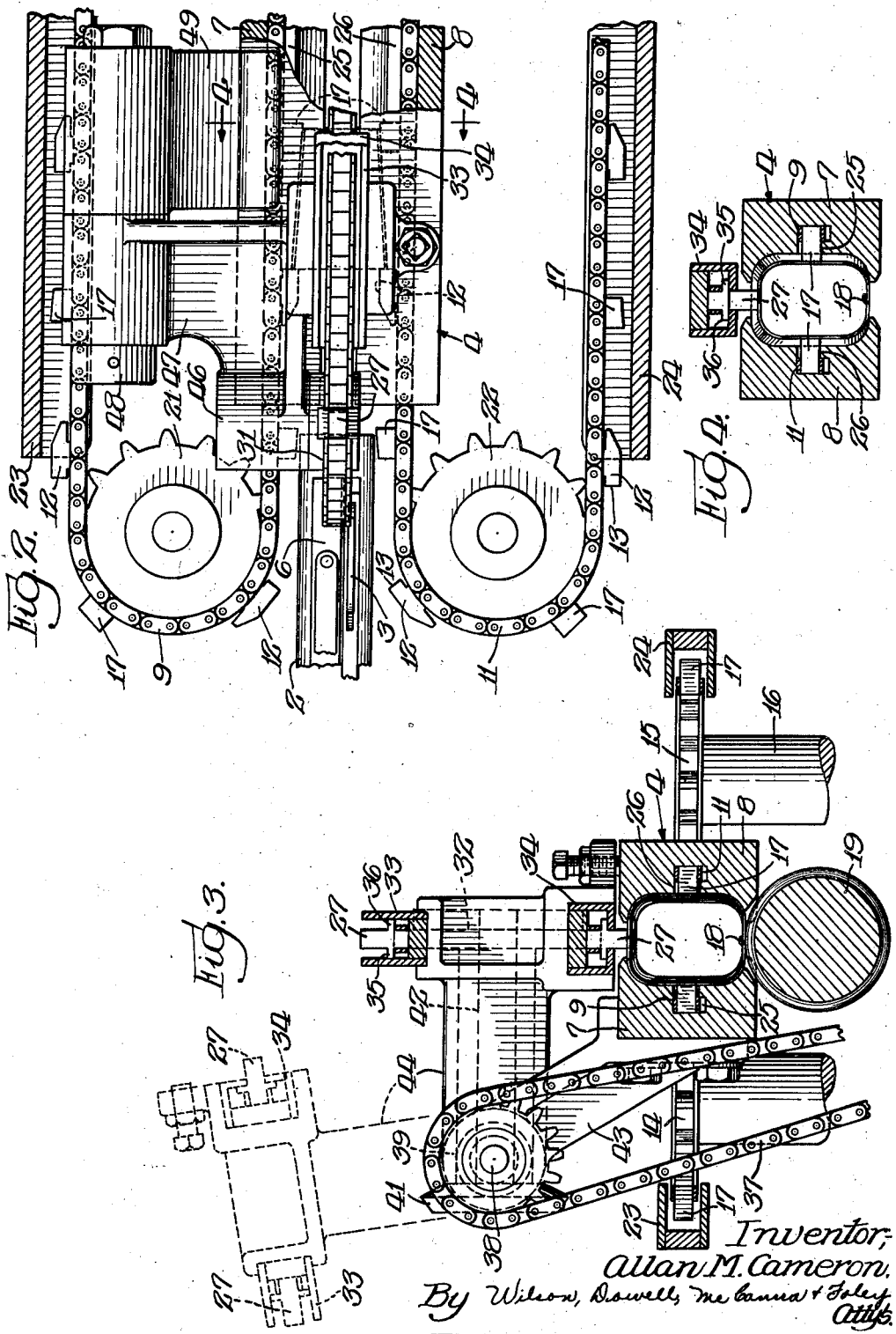
Inventor,
Allan M. Cameron.
By Wilson, Dowell, McCanna & Foley
Attys.

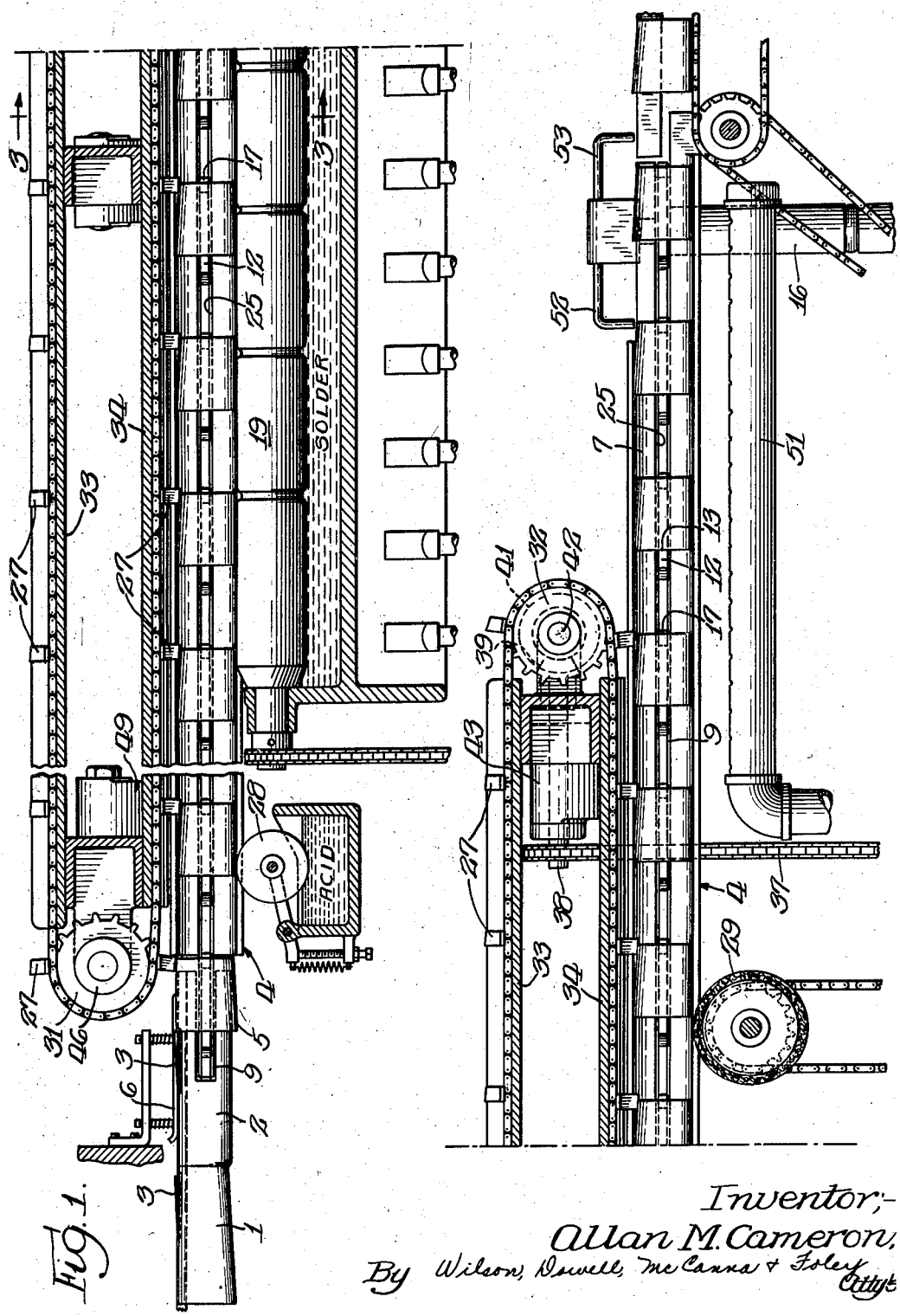

Aug. 31, 1937.     A. M. CAMERON     2,091,804
CAN SOLDERING MACHINE
Filed Aug. 22, 1935     3 Sheets-Sheet 3
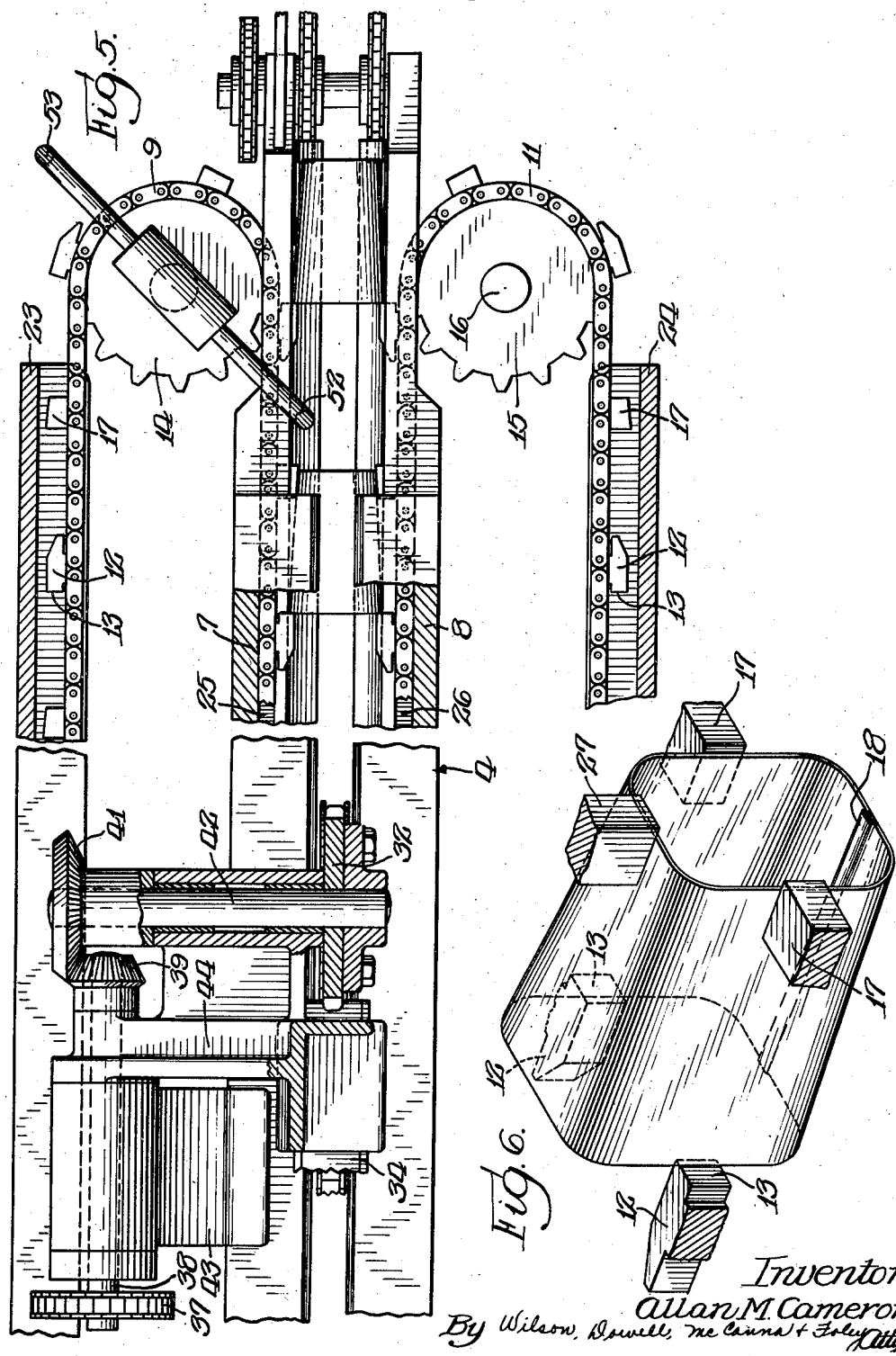
Inventor;
Allan M. Cameron,
By Wilson, Dowell, McCanna + Foley Attys.

Patented Aug. 31, 1937

2,091,804

UNITED STATES PATENT OFFICE 2,091,804

CAN SOLDERING MACHINE

Allan M. Cameron, Oak Park, Ill., assignor to Cameron Can Machinery Co., Chicago, Ill., a corporation of Illinois Application August 22, 1935, Serial No. 37,265

16 Claims. (Cl. 113—62)

This invention relates in general to soldering machines and has, more particularly, reference to mechanism for soldering side seams on tapered can bodies.

Among the various cans demanded by the canning industries are tapered cans whose interior surfaces are protected against corrosion by lacquer or other suitable protective coatings. In the manufacture of such cans it is desirable to have the coating material applied before the can body is formed. After the body has been formed the side seam, which is preferably a lock seam or lock and lap seam, must be soldered. This procedure involves the application of acid, solder, and a wiping brush to the side seam, each operation requiring a substantial amount of pressure against the side seam.

It is apparent that if an internal horn were used in the soldering machine, over which the can bodies might be advanced, to prevent the side seams from yielding under each application of pressure, the coated interior surfaces of the can bodies might become scratched or the coating otherwise injured.

On the other hand, while an external horn will avoid scratching the inner coated surfaces of the tapered can bodies, it must have a diameter large enough to receive snugly the larger end of each tapered can body and therefore cannot hold the smaller end against vertical or lateral displacement when the side seam is subjected to pressure.

This invention is concerned with the problem of holding internally coated can bodies firmly during their passage through soldering machines so that their interior surfaces will not be scratched but nevertheless so that their side seams can be effectively subjected to pressure and properly soldered.

It is an object of this invention to solve the above-mentioned difficulty by providing means for holding said seams of tapered can bodies firmly and accurately in the proper position to be operated upon by the can soldering mechanism.

Another object of the invention is to provide means for gripping the tapered can bodies to accomplish the foregoing object without marring their internal surfaces and without creating any obstacles to the high speed and accurate operation of the soldering machines.

A further object of the invention is to provide means in conjunction with an external horn for gripping can bodies to accomplish the first mentioned object.

Other objects and advantages of the invention will be apparent as the same becomes better understood by reference to the following description when considered in connection with the accompanying drawings.

Referring to the drawings:

Fig. 1 is displayed in two parts because of the length of the machine and constitutes a vertical central section showing only those portions of the soldering machine which are essential to an understanding of this invention;

Fig. 2 is a plan view of the end of the soldering machine into which the tapered cans enter;

Fig. 3 is a vertical sectional view approximately on the line 3—3 of Fig. 1;

Fig. 4 is a vertical section on the line 4—4 of Fig. 2;

Fig. 5 is a plan view with portions thereof in section showing the delivery end of a soldering machine; and Fig. 6 is a diagrammatic showing of a tapered can body showing the various dogs or fingers which propel and guide it during its progress through the soldering machine.

The driving mechanisms for the several endless chains shown herein and the various rotating devices, such as the acid wheel, the soldering roll, and the brush, are not shown and described in this specification as they are not herein claimed and may preferably be the mechanisms shown in a prior United States Letters Patent No. 1,883,539, granted to William Cameron on October 18, 1932.

As is customary, the soldering machine herein described is arranged in line with a can body forming machine, the forming horn of which is herein shown in Fig. 1 and bears the reference numeral 1. It will be noted that this horn is tapered, and as will be understood by those skilled in the art a lock seam can may be formed about this horn and the seam joined and locked on the under side of the horn by means of mechanisms not herein shown but which are well understood in the art.

Adjoining the forming horn 1 is a horn extension 2 onto which the tapered can bodies are moved with the small end leading.

Fig. 1 shows dogs 3 which are part of the usual reciprocating feeding means commonly employed on can body making machines for advancing the unformed and formed can bodies therethrough and which are employed herein for advancing the can bodies onto the horn extension and from there to a position where they may be picked up by the advancing means in the soldering machine to be carried into the external horn generally indicated as 4. While the can bodies are passing over the the horn extension, they are held lightly with the upper side thereof sliding along the top of the horn extension. The lower side carrying the side seam to be soldered occupies the position shown by the can body 5. While passing over the horn extension, a spring pressed guide 6 holds the can bodies in the desired position on the horn extension. Other means, however, may be employed to hold and guide the tapered can body into a position where it may be picked up by the feeding or advancing mechanism in the soldering machine.

In view of the fact that the interior surfaces of these tapered can bodies are lacquered or otherwise coated for the purpose of prohibiting corrosion, I prefer to employ as part of the means for guiding the can bodies through the soldering machine an external horn which is concave and otherwise shaped and proportioned to snugly surround the larger end of the tapered cans. As shown in Fig. 3 this horn consists of two parallel bars 7 and 8 somewhat spaced apart and mounted in any suitable manner on the soldering machine to preserve an open space between them at the top and another open space between them at the bottom of the channel through which the can bodies are fed. While this stationary external horn is preferred, some other suitable means may be provided for performing the same function.

Referring to Fig. 2, the two endless chains 9 and 11 are provided on opposite sides of the external horn, each carrying a plurality of feed dogs 12 whose front faces 13 are intended to engage the rear edges of the can bodies for advancing them through the soldering machine. These feed dogs are appropriately spaced upon the chains in the usual manner so that each one will be timed to swing into can feeding position at the time a can is pushed far enough along the horn extension to be picked up by the feed chain dogs. These feed chains lie preferably in the same horizontal plane at opposite sides of the can bodies and are driven, as is customary, by sprocket wheels 14 and 15 (see Fig. 5), these wheels in turn being each driven by an upwardly extending universally jointed shaft, one of which, numbered 16, is shown in the lower half of Fig. 1. Reference may be had to the prior patent of William Cameron, No. 1,883,539, issued October 18, 1932, for a more perfect understanding of the driving mechanism, the mechanism therein shown being that which is preferably adopted in this invention.

Also carried on the chains are a plurality of spacing fingers 17 appropriately positioned and proportioned to engage the side walls of the can bodies at or near their front ends as they are being guided through the external horn, there being an opposing pair provided on a chain for each can body. These side guiding fingers, together with the stationary external horn assure that the side seam 18 on each can body (see Fig. 6) will be held during the course of the can bodies through the soldering machine on a line parallel to the axis of the horn, or parallel to the line of travel of the can bodies. Thus, as the side seams move past the soldering rolls 19, assurance is given that each side seam will throughout its entire length be contacted by the periphery of the soldering roll.

The front ends of the feed dog chains are supported on sprockets 21 and 22 which are journalled on the frame of the soldering machine in any suitable manner, not shown. Protective guide bars of channel shape indicated as 23 and 24 are provided to house and cover the returning leg of each feed chain while the advancing leg of each feed chain passes through appropriately shaped grooves 25 and 26 provided in the external horn, as shown in Fig. 3. The guiding fingers 17 have enlarged rear portions which fit snugly in the recesses of the grooves 25 and 26 to make certain that these fingers are accurately positioned so that the side seam will always move exactly along the center of the horn.

Additional means for assisting in guiding the can bodies is provided by another endless chain mounted above the horn and having fingers 27 which extend downwardly through the open space between the horn members at the top thereof. As is shown best in Figs. 3, 4, and 6, these fingers contact the upper sides of the can bodies near the small end thereof and thereby hold the bottom side wall of the can bodies flatly in the bottom of the external horn and hence hold the side seams in a plane parallel to the axis of the external horn. Hence, when the acid wheel 28, the soldering roll 19, and the rotary brush 29 press up against the side seams of the can bodies, these seams will not yield. The particular manner of driving the soldering roll or the wheel 29, which brushes off the excess solder, does not form a part of this invention. A satisfactory driving mechanism for these parts is shown in the abovementioned Patent No. 1,883,539, issued to William Cameron.

The top guide chain is supported on an idler sprocket wheel 31 and a driving sprocket 32 together with an upper guide channel bar 33 and a lower guide channel bar 34. As shown in Figs. 3 and 4, the rear extension of each of the guide fingers 27 abuts the back wall of a recess in the guide bar 34, thus positively preventing the can bodies from being lifted out of the plane of their intended path of travel. Side flanges 35 and 36 on each of the guide fingers 27 prevent these fingers from dropping down into the horn further than is desired. The top guide chain is driven by means of a chain 37, shaft 38, beveled gears 39 and 41, and thence by the shaft 42 on which the driving sprocket 32 is fixed. The shaft 38 is journalled in a bracket 43 which is fixed upon the frame of the soldering machine. A bracket 44 is pivotally mounted about the shaft 38 and provides in a side extension thereof a bearing for the shaft 42 and likewise a support for the upper guide channel 33 and the lower guide channel 34. The sprocket 31 at the forward end of the overhead chain is supported on a trunnion carried by a bearing 46 which is formed on a bracket 47, the bracket being pivoted about a pin 48 which is in turn supported on a pedestal 49 mounted on the side of the frame of the soldering machine. The center line of the pin 48 is aligned with the center line of shaft 38 which makes it possible therefore to swing the entire overhead chain and the channel bars, which guide the upper and lower reaches of the chain, as a unit upwardly away from the top of the external horn. This raised position is indicated by the dotted lines in Fig. 3. The assembly unit carrying the overhead chain therefore can be raised from the top of the horn without disconnecting or in any manner interfering with the driving connections therefor. This feature is of considerable advantage as it permits a more ready inspection of the interior of the external horn and facilitates inspection of the chain itself.

The operation of the device may briefly be described as follows: The tapered cans after being formed on the horn 1 and their seams locked on the underside of that horn are then advanced by means of the feed dogs 3 onto the horn extension 2 far enough for the feed dogs 12 on the horizontal or side chains to pick up the can bodies successively and at spaced intervals and advance them into the external horn. As each tapered can body moves into the external horn, the guide fingers 17 also carried on the chains at opposite sides of the horn embrace the sides at the small end of each can body and in conjunction with the external horn hold the side seam parallel to the axis of the horn. At the same time the guide fingers 27 provided on the overhead chain contact the top side of each can body near the smaller end portion of the can bodies and hold the side seam flat upon the bed of the external horn. Hence as the cans proceed past the acid wheel, the solder roll, and the wiping brush 29, each seam is perfectly aligned with and held in firm contact with each of the devices mentioned which operate on the side seams. After the can bodies pass beyond the wheel 29 they are subjected to a blast of cooling air from the pipe 51 and eventually are discharged from the end of the external horn by means of the fingers 52 and 53 which strike the rear edge of alternate can bodies after they have been released by the overhead guide fingers and at the time they are released by the feed dogs and guide fingers on the side chains.

It should be understood that while tapered can bodies of nearly rectangular cross section are shown, the apparatus employed in this invention can be modified, within the scope of the invention, to handle tapered can bodies of circular cross section or of other cross sections.

While the drawings and specification illustrate and describe the preferred embodiment of this invention, it will be apparent to those skilled in this art that the objects of this invention may be accomplished by devices which are varied somewhat from the disclosed embodiment, and that such modified forms and variations of the invention are contemplated and comprehended within the scope of the claims which follow.

Having shown and described my invention, I claim:

1. A soldering machine including an external horn shaped to guide the larger ends of tapered can bodies, means for advancing the can bodies through the external horn, and means engaging the exterior of said bodies remote from the larger ends thereof for holding the side seams thereof parallel to the axis of the external horn during progress of the can bodies through said horn.

2. In a can soldering machine, an external horn shaped to closely surround the large end of a tapered can body, means for advancing the can along said horn, and means contacting the exterior of the narrow end portion of the can for holding the side seam of the can in a plane parallel to the axis of the horn.

3. In a can soldering machine, an external horn shaped to surround and guide the large end of a tapered can body, means for advancing the can along said horn, and means extending into the interior of the horn into position to contact the exterior of the small end portion of the can for holding the side seam of the can in a plane parallel to the axis of the horn.

4. In a can body soldering machine, an external horn shaped to surround the large end of a tapered can body, means for advancing a body along said horn, and means projecting into said horn into contact with the exterior of three sides of the can near its narrow end portion for holding the side seam of the body parallel with the axis of the horn.

5. A tapered can body soldering machine including an external horn shaped to closely surround the larger ends of can bodies, and means extending into and movable relatively to said horn for externally gripping the can bodies near their smaller ends while they are advancing through said horn for holding said bodies in predetermined position.

6. In a can soldering machine including a soldering device, means for advancing tapered can bodies successively past said device, stationary means for guiding one end of said bodies, and movable means for guiding the other end of said bodies, whereby accurate positioning of the side seams of said bodies with respect to said soldering device is insured.

7. A machine for soldering the side seams of tapered can bodies, comprising a solder applying device, means for advancing can bodies past said device, stationary guiding means externally contacting the larger end portions of said bodies, and movable guiding means externally contacting the can bodies in proximity to the smaller ends thereof, whereby the side seams are maintained in a predetermined position when passing said device.

8. In a can soldering machine, an external horn shaped to guide the large end of a tapered can body, means for advancing the body along said horn, and means projecting into the horn into contact with the smaller end portion of the body and movable therewith for maintaining the body side seam in parallelism with the direction of travel of said body.

9. In a can soldering machine, an external horn shaped to surround and guide the large end of a tapered can body, means for advancing the body along said horn, and means extending into the interior of the horn in position to exteriorly contact and guide the smaller end portion of the body for maintaining the body side seam parallel with the axis of the horn, said guiding means being movable with said body.

10. In a machine for soldering the side seam of tapered can bodies, soldering mechanism, means for advancing bodies, means for guiding the large end of said bodies in transit, means movable with and exteriorly engaging at the small end of the body the body wall opposite the side seam to prevent movement of said small end away from the plane of said soldering mechanism.

11. In a can soldering machine, an external horn shaped to surround and guide the large end of a tapered can body, means for advancing the body along said horn, and means movable along said horn with the body and extending into the interior of the horn into contact with the exterior of the opposite sides of said body near the narrow end portion thereof for holding the small end of said body against lateral displacement.

12. In a machine for soldering the side seam of tapered can bodies, the combination of soldering mechanism, means for advancing bodies, means for guiding the large end of said bodies in transit, and means movable with and exteriorly engaging the vertical body walls at the small end of the body to prevent lateral movement of said small end relatively to said soldering mechanism.

13. A machine for soldering tapered can bodies comprising a hollow horn proportioned to guide the large end of a tapered body passing therethrough, means for advancing bodies through said horn, a soldering device beneath said horn, a guide finger projecting downwardly into said horn in contact with the upper wall of said body near the small end thereof for preventing upward movement of said end, and a plurality of opposed guide fingers projecting laterally into said horn into contact with the side walls of said body near the smaller end thereof for preventing lateral movement of said end, said fingers being movable with said body longitudinally of said horn.

14. A machine for soldering tapered can bodies comprising a hollow horn proportioned to guide the large end of a tapered body passing therethrough, means for advancing bodies through said horn, a soldering device beneath the horn, and a guide finger projecting downwardly into said horn into contact with the upper wall of said body near the smaller end thereof for preventing upward movement of said end, said finger being mounted to move longitudinally of said horn with said body.

15. A machine for soldering tapered can bodies comprising a hollow horn proportioned to guide the large end of a tapered body passing therethrough, means for advancing bodies through said horn, a soldering device, and a plurality of opposed guide fingers projecting laterally into said horn into contact with the side walls of said body near the smaller end thereof for preventing lateral displacement of said end in transit, said fingers being movable longitudinally of said horn with said body.

16. A machine for soldering tapered bodies comprising a soldering device, means for advancing bodies past said device, means for guiding the larger ends of the can bodies during the advancing movements thereof, and a plurality of guiding devices movable with the can bodies positioned to engage and retain the smaller ends of the can bodies in predetermined relation to said soldering device during movement of said bodies relatively to said device.

ALLAN M. CAMERON.